Dec. 8, 1964   D. I. FRUSH   3,160,857
DATA TRANSFER CONTROL AND CHECK APPARATUS
Filed March 24, 1960   6 Sheets-Sheet 3

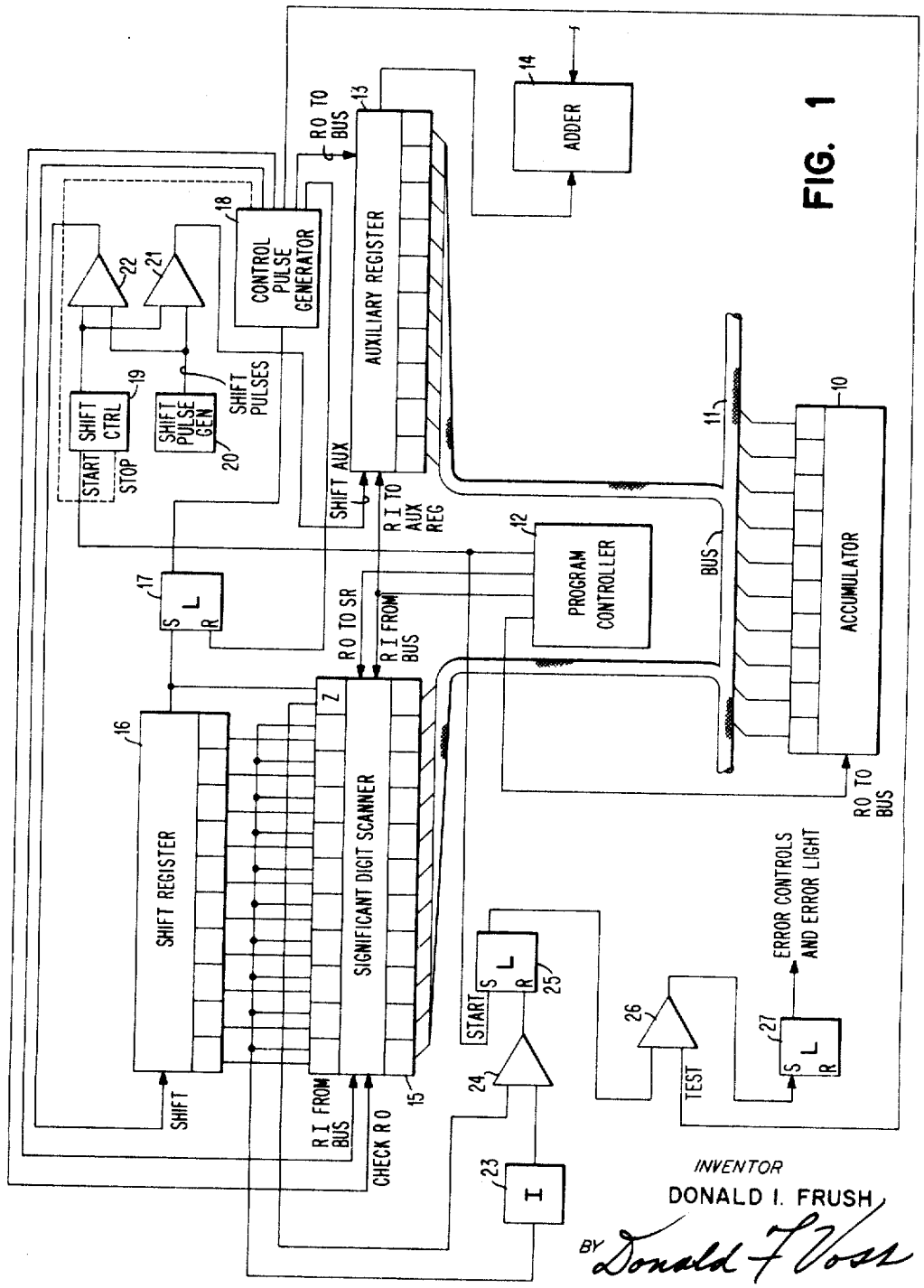

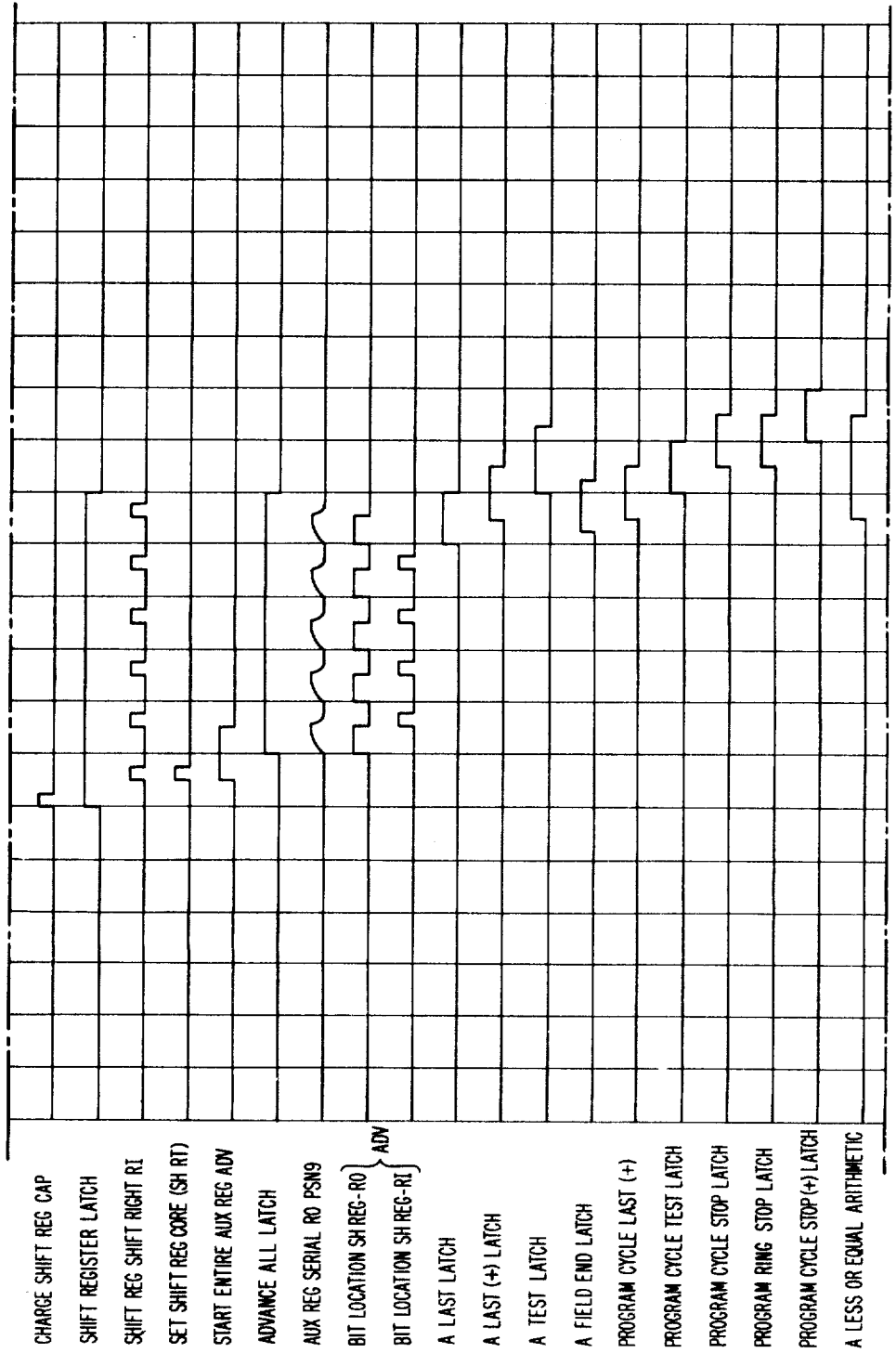

United States Patent Office 3,160,857
Patented Dec. 8, 1964

3,160,857
DATA TRANSFER CONTROL AND CHECK
APPARATUS
Donald I. Frush, Endwell, N.Y., assignor to International
Business Machines Corporation, New York, N.Y., a corporation of New York
Filed Mar. 24, 1960, Ser. No. 17,331
18 Claims. (Cl. 340—172.5)

This invention relates to apparatus for controlling the transfer of data in coded form from a storage device and for checking to ascertain if in fact all of the data has been transferred, and, more particularly, relates to apparatus for controlling the transfer of variable amounts of data from a storage device having a fixed capacity and for checking to see if all of the data after any one transfer time has, in fact, been transferred.

The invention is particularly suited to enable data processing machines to process data at higher rates. It is quite common for data processing machines to perform data processing operations where, during each operation, a different amount of data is processed. Of course, a data processing machine could have a fixed processing cycle which would accommodate the maximum amount of data that could be processed at any one time. However, this type of data processing machine would be rather slow, because each operation would take a maximum amount of time regardless whether or not a maximum amount of data is being processed. The rate of a data processing machine can be increased by making the rate of the processing cycle variable so as to be coextensive with the amount of data being processed during any one processing cycle. This invention enables the processing of variable amounts of data without any appreciable loss of time. For instance, during one arithmetic operation, the data word length may be very large, while, during a subsequent operation, the data word length may be relatively small. An appreciable amount of time would be lost if the data processing machine consumed the same amount of time for processing small data word lengths as it does for large data word lengths.

In order to enhance the desirable feature of being able to process data words of variable lengths at a rate determined by the particular data word length, the invention provides for a check for determining whether or not all of the particular data has been processed during the time for processing a data word of that particular length. In the event all of the data has not been processed within the time set by the length of the data word, then an error signal is generated and the data processing machine is stopped and an error light goes on.

In the present invention, the variable word of data, during a particular processing operation, which is to be combined with another variable word of data or with a fixed word of data, is contained in one data register of a fixed capacity while another data word, variable or fixed, is contained in another register. When the variable data word is to be combined with the other data word, variable or fixed, the variable data word is transferred to an arithmetic bus. Then, under proper controls, the variable data word on the arithmetic bus is entered into an auxiliary register. The variable data word on the arithmetic bus is also scanned by a significant digit scanner to determine the highest significant digit of the variable data word. The indication of the highest significant digit is transferred from the significant digit scanner to a single core shift register. Data is then transferred from the auxiliary register to an adder by shifting the auxiliary register position by position. However, the single core shift register is shifted simultaneously with the shifting of the auxiliary register. When a signal is received upon the indication of the highest significant digit being shifted from the last position of the single core shift register, it is an indication that the last significant digit has left the auxiliary register. This signal is utilized to develop various control signals. One of the control signals so developed causes an entry of data, significant or otherwise, from all positions of the auxiliary register to the arithmetic bus. Another control signal then causes the significant digit scanner to scan the arithmetic bus, which, if no error occurred should not contain any significant data. By means of another developed control impulse, the significant digit scanner is sampled or read out to permit testing to see if the significant digit scanner had detected any significant digits on the arithmetic bus which now contains the data which had been in the auxiliary register after a signal indicated that all significant digits have been read out of the auxiliary register.

Upon testing the significant digit scanner, if there is a significant digit present, an error signal is generated which is utilized to stop the data processing machine and to turn on an error light. However, if no significant digit is present in the significant digit scanner, the data processing machine is permitted to continue in operation.

Accordingly, a prime object of the invention is to enable a data processing machine to process variable amounts of data without any appreciable loss of time.

Another important object of the invention is to provide in a data processing machine apparatus for determining when the last significant portion of data of a variable length data word has been transferred from a data storage device so as to signal the data processing machine that it may start a new operation.

Still another very important object of the invention is to provide apparatus for checking the data storage device to see if, in fact, all significant data of a variable length data word has been transferred when a signal indicates that all significant data has been transferred from the data storage device.

An additional object of the invention is to provide apparatus for developing an error signal if, in fact, significant data is still contained within the data storage device after a signal indicates that all significant data has been transferred from the storage device.

The foregoing and other objects, features and advantages of the invention will be apparent from the following more particular description of preferred embodiments of the invention, as illustrated in the accompanying drawings.

In the drawings:
FIG. 1 is a schematic diagram of a data processing machine embodying the invention;
FIGS. 2a and 2b, with FIG. 2b disposed to the right of FIG. 2a, are a schematic diagram of a preferred embodiment of the data processing machine in FIG. 1; and,
FIGS. 3a, 3b and 3c represent a timing diagram.

*General*

With reference to the drawings, the invention is schematically illustrated in FIG. 1. In FIG. 1, an accumulator 10 is a data storage device or register of a fixed capacity adapted to contain data of variable word lengths. As it wil be seen shortly, the data in the accumulator 10 will be transferred to an arithmetic unit to be combined with data coming to the arithmetic unit from another source. The accumulator 10 is a register of the type shown and described in detail in copending application Serial No. 862,919, filed December 30, 1959, for Data Transfer Apparatus by L. R. Adams et al. As described in the referenced application, a plurality of magnetic core shift registers are provided with a common transmission channel or bus and may selectively receive information from or feed information to the bus. The transmission bus has connected thereto a secondary storage unit in the form of a capacitor for temporarily storing an output received from any one of the shift registers connected thereto. A data bit stored in the selected stage of a particular register is fed to the common capacitor storage device by reversing the magnetic state of the magnetic core of the particular stage and transferring the amplified signals developed as the result of the change of state in the core into the common storage capacitor of the transmission bus. A common capacitor stores the signal temporarily until some other shift register or signal receiving device is selected to receive the stored signal. The several signal receiving devices are each equipped with switching means enabling any of the devices to be switched to a condition for receiving the stored signal from the common capacitor. Several shift registers are also equipped with switching means whereby any one of the shift registers may be selectively switched to a condition for charging the common capacitor. Thus, a plurality of shift registers share a common transmission channel having a common temporary storage device. The information in any one register may be shifted out or transferred in parallel to another register.

In this example, the data contained in the accumulator 10 at any time is adapted to be transferred therefrom in parallel to an arithmetic bus 11. The particular apparatus for effecting the transfer of data in the accumulator 10 in parallel to the bus 11 will be described in detail later herein. However, essentially, a signal is generated by a program controller unit 12 to cause the readout of data from the accumulator 10 to the bus 11. An auxiliary register 13, similar to the register 10, is connected to the bus 11 so as to receive information therefrom and to permit the transfer of information thereto in parallel. The auxiliary register 13 is also of fixed capacity, which corresponds to the capacity of the accumulator 10; i.e., it has a plurality of stages for storing data in coded form, the stages correspond to those of the accumulator 10. Controls will be described later herein for reading in information in parallel from the bus 11 to the auxiliary register 13 and also the readout of information in the register 13 to the bus 11. Additionally, controls will be described for the shifting of information from the auxiliary register 13 to a single digit adder 14. Essentially, the program controller 12 develops a signal enabling parallel entry of data from the bus 11 into the auxiliary register 13.

A high order significant digit detection means or a significant digit scanner 15 is connected to the bus 11. The significant digit scanner 15 is a high order significant digit detection circuit of the type shown and described in detail in copending application Serial No. 862,907, now Patent No. 3,067,735 filed December 30, 1959, for High Order Detector Circuit by E. B. Eichelberger. As described in the referenced application, a plurality of denominationally ordered signal generating devices are provided for manifesting signals on outputs when a significant digit indication is present at an input. The output of each of these signal generating devices is appropriately amplified and fed to a winding on a correspondingly ordered magnetic core to produce a magnetomotive force tending to "set" the core. In addition, the amplified output signal is also fed to a winding on each lower ordered magnetic core to produce a magnetomotive force tending to reset all the lower ordered magnetic cores. By this arrangement, only the high ordered core receiving a signal is set. All the cores are interrogated and only the set core produces an output signal; the output signal is indicative of the order containing the high order significant digit. In this example, the significant digit scanner 15 also includes a ZERO position. The ZERO position is set if there are no significant digits on the bus 11. By the arrangement of apparatus just described, the high order significant digit of the data in auxiliary register 13 can be detected by the significant digit scanner 15 through the facility of the bus 11, because the data transferred from the accumulator 10 to the bus 11 is also received by the auxiliary register 13. The significant digit scanner 15, in addition to the ZERO position, has as many positions as that of the auxiliary register 13 which, in this example, correspond to the positions or stages of the accumulator 10. The controls for reading the information from the bus 11 to the significant digit scanner 15 will be described later herein. Essentially, the program controller 12 develops a signal enabling the significant digit scanner 15 to scan the data on the bus 11.

Each position of the significant digit scanner 15 has several outputs; and one of the outputs from each position, except the ZERO position, is connected to a corresponding position of a multiple-stage single core shift register 16. The accumulator 10 and auxiliary register 13 have several cores per stage or position, as described in copending application Serial No. 17,422, filed March 24, 1960, for Computer Program System, by E. R. Marsh, while the single core shift register 16 has only one core per stage or position. The reason for this is that the accumulator 10 and auxiliary register 13 are adapted to have each stage represent data in coded form; and, for this example, data is represented by the two-out-of-five code; i.e., the bits 0, 1, 2, 3 and 6 are used to represent data in coded form, as described in the referenced copending application Serial No. 862,907. The single core shift register 16 functions not to store data in the sense of the accumulator 10 or the auxiliary register 13, but rather functions to store an indicator mark corresponding to the order position of the significant digit scanner containing the high order significant digit as detected by the significant digit scanner 15. While the single core shift register 16 make take any suitable form, it can be a magnetic core shift register, as shown and described in the referenced application Serial No. 862,919.

The output of the single core shift register 16 is taken from the last order position or the extreme right position of the shift register 16. The output of the single core shift register, as shown, is connected to a latch 17 to set the same ON. The latch 17 functions to store the fact that an output has been received from the single core shift register 16 or, in other words, that the mark or indication of the high order significant digit has been read out from the single core shift register 16. The latch 17 is appropriately reset at the proper time by a suitable reset impulse, to be described later herein. The latch 17 is also settable by the ZERO position of the significant digit scanner 15. By this arrangement, if for any reason no significant data transfers from the accumulator 10 to the bus 11, then, upon scanning the bus 11, the ZERO position is rendered active and the latch 17 is set.

The output of the latch 17 associated with the set side thereof is connected to a control pulse generator 18, to be described in detail later herein. Essentially, the control pulse generator 18 develops control impulses for causing the readout of information in the auxiliary register 13 to the bus 11 and, subsequently, for the read-in of information then on the bus 11 to the significant digit scanner 15. The information in the auxiliary register 13 is shifted out to the adder 13 as the single core shift register 16 is shifted. A shift control unit 19 controls the flow of shift impulses generated by a suitable impulse generator 20 and applied to inputs of logical AND circuits 21 and 22. The output of the logical AND circuit 21 is connected to the shift control of the auxiliary register 13, whereby shift impulses passing from the logical AND circuit 21 will cause data to be shifted out from the auxliary register 13 to the adder 14. The output of the logical AND circuit 22 is connected to the shift control of the single core shift register 16. Hence, shift impulses are also applied to shift the single core shift register 16 in synchronism with the advancement of data from the auxiliary register 13 to the adder 14. Hence, when the highest significant digit passes from the auxiliary register 13, the indication of the highest significant digit in the single core shift register is simultaneously passing from the single core shift register 16 to the latch 17 to set the same.

In order to determine whether or not any significant digits are still retained in the auxiliary register 13 after an indication has passed from the single core shift register 16 to the latch 17, the information in the auxiliary register 13 is looked at by the significant digit scanner 15. This is accomplished by reading out the information in the auxiliary register 13, prior to the same being shifted after the indication has left the single core shift register 16, onto the bus 11. The bus 11 is then scanned by the significant digit scanner 15 in response to an impulse generated by the control impulse generator 18, which is activated by the latch 17 being set. At this time, other outputs of the stages of the significant digit scanner 15 are looked at in response to a signal also generated by the control impulse generator 18. The said other outputs from the positions or stages of the significant digit scanner, 0–9, are commonly connected; and the common connection is led to the input of an inverter 23 while another output of the ZERO position of the significant digit scanner 15 is connected as an input to a logical AND circuit 24, also having an input from the output of the inverter 23. The output of the logical AND circuit 24 is connected to a reset terminal of a latch 25 having its set terminal connected to receive a start impulse from the program controller 12. The output of the latch 25 associated with the set side thereof is connected as an input to a logical AND circuit 26, also having an input for receiving a test signal from the control impulse generator 18. The output of the logical AND circuit 26 is connected to the set terminal of an error latch 27. The output of the error latch 27 associated with the set side thereof is connected to error controls for stopping the data processing machine and to an error light, not shown.

If all significant data had been shifted out of the auxiliary register 13 to the adder 14 by the time the indication or mark leaves the single core shift register 16, then the information which is subsequently transferred from the auxiliary register 13 to the bus 11 should not contain any significant digits. Further, when the significant digit scanner 15 looks at the bus 11, it should not then detect any significant digits. Consequently, the ZERO position of the significant digit scanner 15 should be active while all other positions 0–9 should be inactive. Therefore, when the check readout signal from the impulse generator 18 is applied to the significant digit scanner 15 to energize said other and another outputs of the stages of the significant digit scanner, there will be no signal over the common conductor leading to the inverter 23 while there will be a signal over the conductor leading from the ZERO position of the significant digit scanner 15 to the logical AND circuit 24. Consequently, because of the inverter 23, the logical AND circuit 24 will pass a signal to reset the latch 25. Hence, with the latch 25 reset, the logical AND circuit 26 will not be conditioned to pass the test signal coming from the control impulse generator 18. Since the logical AND circuit 26 does not pass the test signal, the error latch 27 will not be set and, therefore, the error controls for the data processing machine and the error light will not be activated and the data processing machine may progress to start a new operation.

If any significant digits remain in the auxiliary register 13 after the indication has passed from the single core shift register 16, indicating that all significant digits should have been read from the auxiliary register 13 to the adder 14, then the bus 11 will receive significant digits from the auxiliary register 13. The significant digit scanner 15, in scanning the bus 11 at that time, in response to a signal from the control impulse generator 18, will detect a significant digit. Therefore, the ZERO position of the significant digit scanner 15 will not be active whereas one of the other positions, 0–9, of the significant digit scanner will be active. Consequently, because of the inverter 23, there will not be a positive signal on either inputs of the logical AND circuit 24. Therefore, the latch 25 will not be reset. Hence, the logical AND circuit 26 will be conditioned to pass the test signal coming from the control impulse generator device 18. As the logical AND circuit 26 passes the test signal, the error latch 27 will be set and the error controls and error light will be activated, thereby stopping the machine and indicating that an error has occurred, respectively.

*Detailed Description*

Figure 2A:
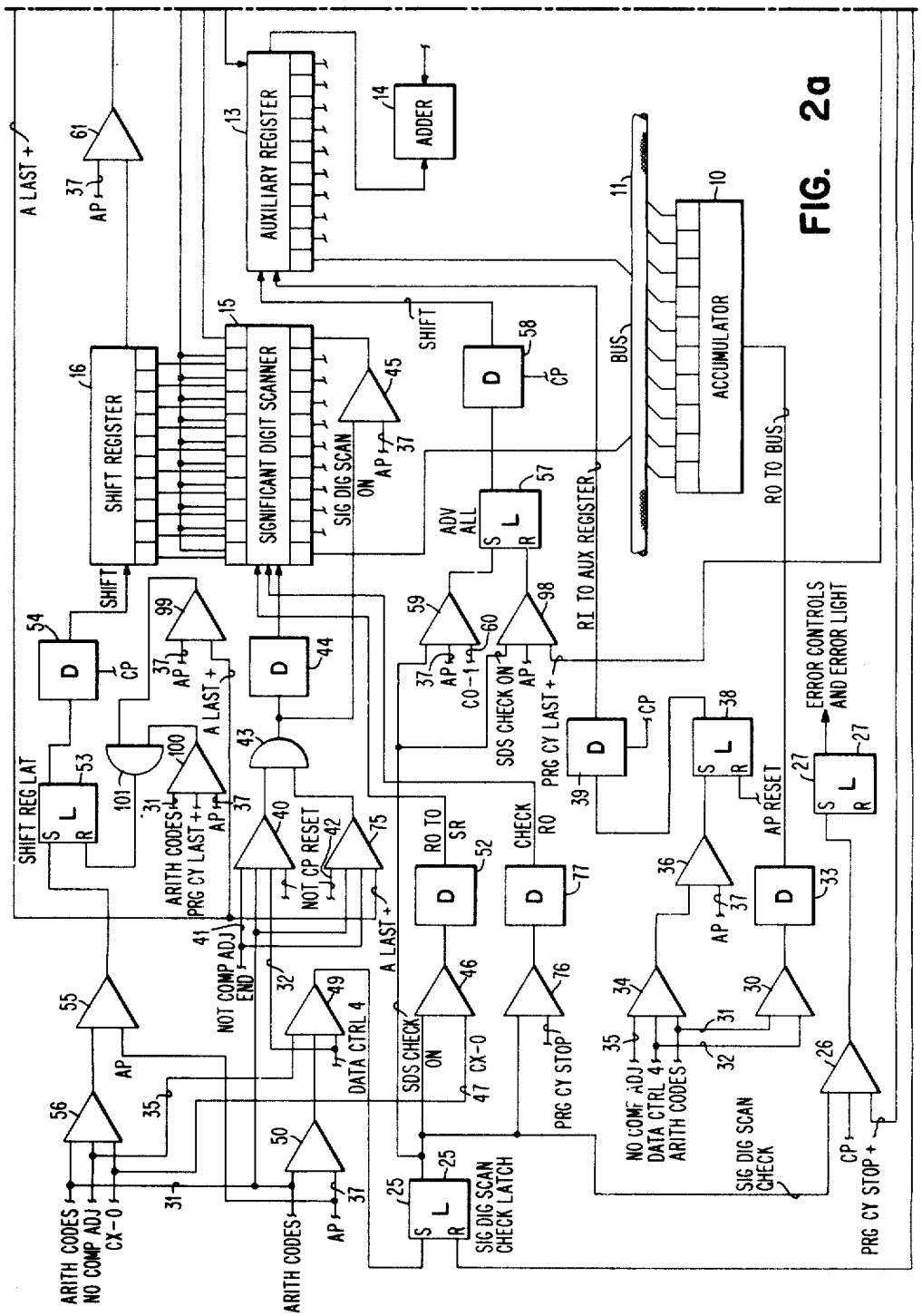

In the detailed description, the elements identical to those appearing in the general description will carry the same reference character. The equivalency between the various elements in the general description and in the detailed description will become readily apparent as the detailed description progresses. Generally, the switching elements and the control impulses for controlling the switching elements are shown and described in detail in the referenced copending application Serial No. 17,422.

With reference to FIG. 2a, the particular apparatus for effecting the transfer of data in the accumulator 10 in parallel to the bus 11 consists of a logical AND circuit 30 having two input conductors 31 and 32 for receiving a Data Control 4 signal and an Arithmetic Codes signal, respectively. The output of the logical AND circuit 30 is connected to the input of a driver 33 which, in turn, has its output connected to the accumulator 10 for driving the information therefrom in parallel to the bus 11.

The controls for reading the information from the bus 11 into the auxiliary register 13 includes a logical AND circuit 34 also having input conductors 31 and 32 for receiving a Data Control 4 signal and an Arithmetic Codes signal and an input conductor 35 for receiving a No Complement Adjust signal, respectively. The output of the logical AND circuit 34 is connected as an input to a logical AND circuit 36 also having an input conductor 37 for receiving an A impulse. The output of the logical AND circuit 36 is connected to the set terminal of a latch 38 to set the same. The latch 38 is reset by an A pulse reset. The output of the latch 38 associated with the set side thereof is connected to the input of a driver 39 which is controlled by a C impulse. The output of the driver 39 is connected to the auxiliary register 13 to control the read-in of data from the bus 11 into the auxiliary register 13.

The apparatus for enabling the significant digit scanner 15 to scan the information on the bus 11 at this time; i.e., after the information has been read out from the accumulator 10 onto the bus 11, includes a logical AND circuit 40 having input conductors 41, 31, 32 and 42 for receiving a Not Complement Adjust End signal, an Arithmetic Codes signal, a Data Control 4 signal and a Not C Pulse Reset signal, respectively. The output of the logical AND circuit 40 is connected as an input to a logical OR circuit 43. The output of the logical OR circuit 43 is connected to the input of a driver 44 having its output connected to the significant digit scanner 15 to enable the same to scan the information on the bus 11. The output of the logical OR circuit 43 is also connected as an input to a logical AND circuit 45, also having an input for receiving an A impulse over conducor 37. The output of the logical AND circuit 45 is connected to the ZERO position of the significant digit scanner 15.

With the order position of the significant digit scanner 15 set to indicate the high order significant digit of the data contained upon the bus 11, which is also the data in the auxiliary register 13, the indication may be transferred to the shift register 16. The readout of the order position of the significant digit scanner 15 containing an indication of the high order digit of the data in the auxiliary register 13 to the shift register 16 is under the control of a logical AND circuit 46. The logical AND circuit 46 has an input conductor 47 for receiving an impulse CX–0 and an input connected to an output associated with the set side of the latch 25. The latch 25 is termed "the significant digit scanner check" latch and has its terminal connected to the output of a logical AND circuit 49. The logical AND circuit 49 has one input conductor 35 for receiving a No Complement Adjust signal, one input conductor 32 for receiving a Data Control 4 signal and another input connected to the output of a logical AND circuit 50. The logical AND circuit 43 has one input conductor 31 for receiving a signal of Arithmetic Codes and one input conductor 37 for receiving an A impulse. The output of the logical AND circuit 46 is connected to the input of a driver 52 having its output connected to control the readout of the order position of the significant digit scanner 15 containing the indication of the highest significant digit to the shift regster 16. With the indication of the order position indicating the high order significant digit of the information in the auxiliary register 13, now having been set in the shift register 16, the information in the auxiliary register 13 may be shifted therefrom to the adder 14. Of course, as the information is shifted from the auxiliary register 13, the indication of the high order digit in the shift register 16 is shifted position by position in synchronism with the shifting of the auxiliary register 13. The shifting of the shift register 16 is under control of a shift register latch 53 having its output associated with the set side thereof connected to the input of the driver 54. The driver 54 is under control of a C impulse and has its output connected to the control for shifting the shift register 16. Hence, the C pulses will advance the shift register 16 position by position when the latch 53 is set. The setting of the shift register latch 53 is under control of a logical AND circuit 55 having its output connected to the set terminal of the latch 53. The logical AND circuit 55 has an input conductor 37 for receiving an A impulse and another input connected to the output of a logical AND circuit 56. The inputs to the logical AND circuit 56 include an input conductor 31 for receiving an Arithmetic Codes signal, a conductor 35 for receiving a No Complement Adjust signal and a conductor 47 for receiving a CX–0 signal.

Figure 3A:
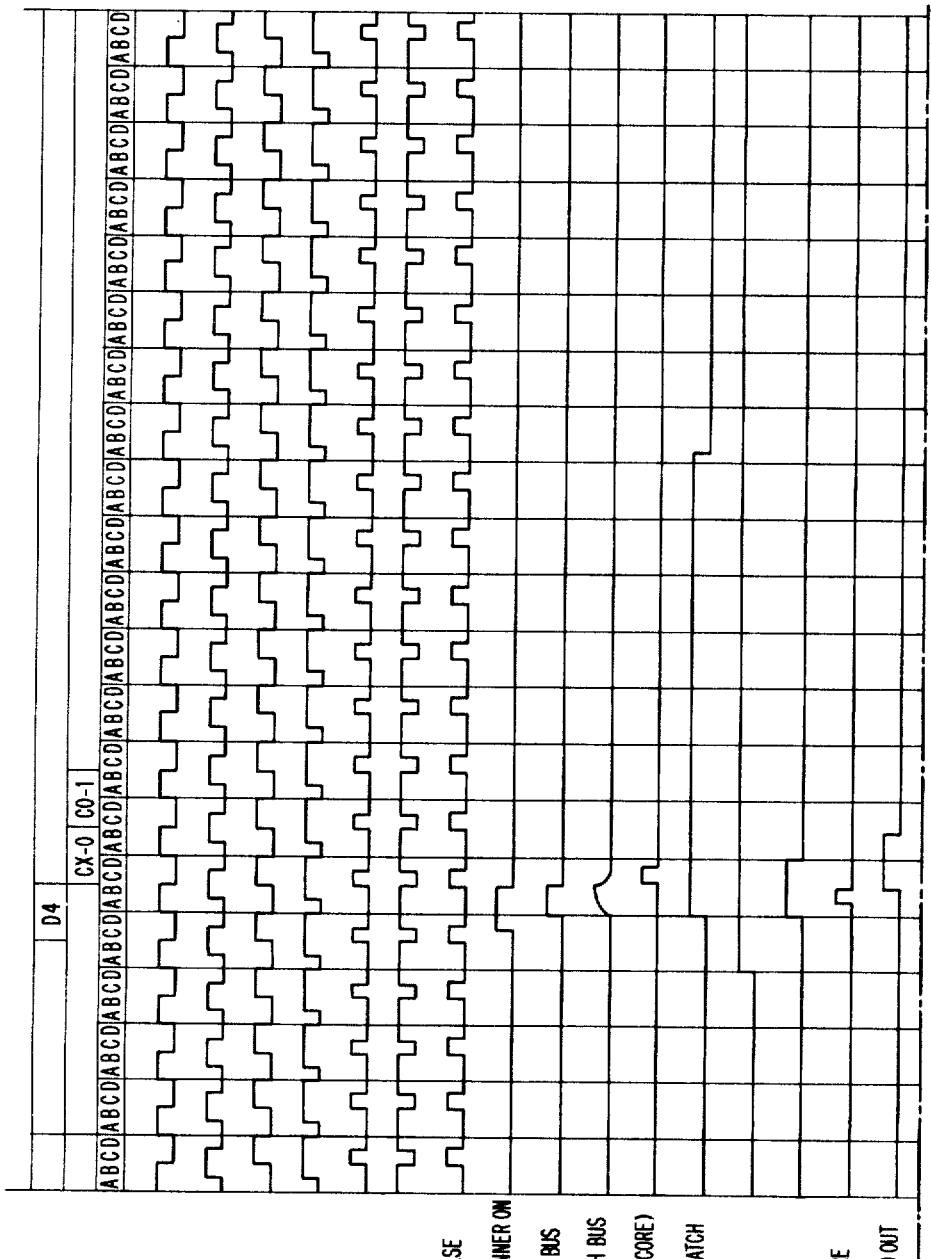
Figure 3C:
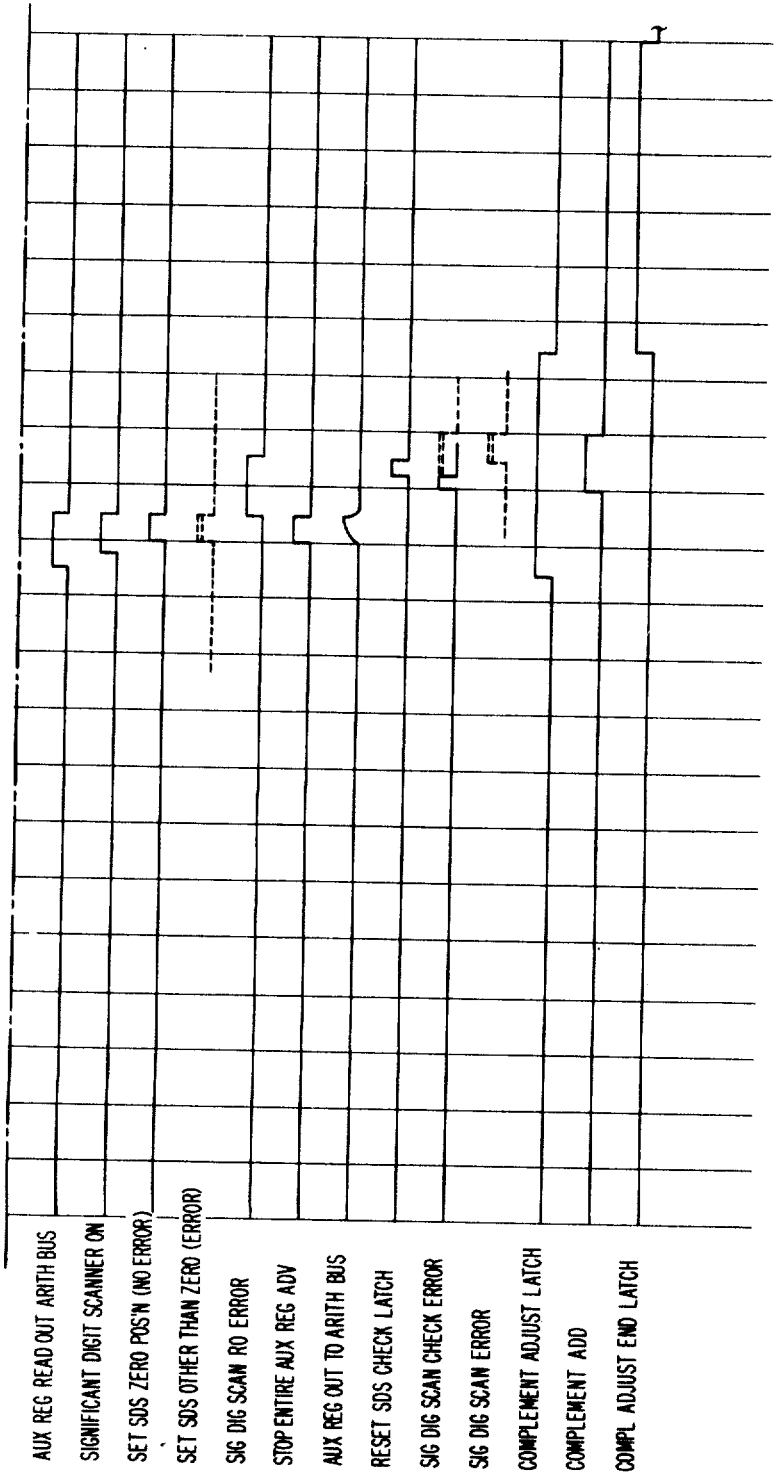

Referring to the timing diagram shown in FIGS. 3a, 3b and 3c, it is seen that, in FIG. 3a, the transfer of the indication of the high order significant digit from the significant digit scanner 15 is read out to the shift register 16 during CX–0 time and the capacitor for the shift register 16 is charged also during CX–0 time. The shift register latch 53 comes on at about the middle of CX–0 time. The Shift Register Shift Right Read-in impulses start during C0–1 time and the order position of the shift register 16 corresponding to the order position of the significant digit scanner 15 indicating the high order significant digit of the information in the auxiliary register 13 has its core set during C0–1 time. Hence, upon the next impulse starting at the end of C0–1 time, the shift register will be shifted one position to the right.

Referring again to FIG. 2a, the shifting of the data from the auxiliary register 13 serially to the adder 14 is under control of an Advance All latch 57 having its output associated with the set side thereof connected to the input of a driver 58. The driver 58 is under the control of a C impulse and has its output connected to the shift control for the auxiliary register 13. The set terminal of the Advance All latch 57 is connected to the output of a logical AND circuit 59. The logical AND circuit 59 has an input for receiving a signal from the output of the significant digit scanner check latch 25 associated with the set side thereof, an input conductor 37 for receiving an A impulse and an input conductor 60 for receiving a C0–1 signal.

Referring to FIG. 3b, it is seen that the start signal for the shifting or advancement of the auxiliary register 13 comes on during the beginning of C0–1 time and the Advance All latch 57 is set at approximately the midportion of C0–1 time. The auxiliary register 13 is then shifted upon the occurrence of a C impulse in synchronism with the shifting of the indication mark in the shift register 16.

The information in the auxiliary register 13 is shifted position by position, as seen in FIG. 3b. Simultaneously, with the serial shifting of the information from the register 13, FIG. 2a, the indication mark of the high order significant digit is shifted in the shift register 16. When the indication of the high order significant digit is shifted from the shift register 16, there is an output signal from the last position on the right of the shift register 16. This position has its output connected to an input of a logical AND circuit 61, also having an input conductor 37 for receiving an A impulse. The output of the logical AND circuit 61 is connected to a set terminal of a latch 62, FIG. 2b, called "A Last." The output of the latch 62 associated with the set side thereof is connected as an input to a logical AND circuit 63 and as an input to a logical AND circuit 64. The logical AND circuit 63 also has an input conductor 31 for receiving an Arithmetic Codes signal and an input conductor 65 for receiving a No A Pulse Reset signal. The output of the logical AND circuit 63 is connected as an input to a logical OR circuit 66, also having an input conductor 67 for receiving a Complement Adjust signal. The output of the logical OR circuit 66 is connected to the set side of a latch 68 termed "A Field End." The latch 68 is for indicating that all of the information has transferred from the auxiliary register 13 to the adder 14.

The logical AND circuit 64 also has an input for receiving a C impulse and for receiving Not A Test signal. The output of the logical AND circuit 64 is connected to the set terminal of a latch 69 termed "A Last +." The output of the latch 69, A Last +, associated with the set side thereof is utilized for effecting the reset of the shift register latch 53 and for causing the auxiliary register 13 to read out in parallel to the bus 11 and for the significant digit scanner 15 to scan the bus 11. The output of the latch 69 associated with the set side thereof is also connected as an input to a logical AND circuit 70, also having an input conductor 37 for receiving an A impulse. The output of the logical AND circuit 70 is connected to the set terminal of a latch 71 designated "A Test." The output of the latch 71 associated with the set side thereof is connected to the input of an inverter 72 having its output connected as an input to the logical AND circuit 64. In this way, the Not A Test signal is developed.

As stated, the output from the latch 69, A Last +, is utilized to cause information in the auxiliary register 13 to read out to the bus 11 and for the significant digit scanner 15 to rescan the bus 11 at this time. The readout of the information in parallel from the auxiliary register 13 to the bus 11 is under control of a latch 73 having its output associated with the set side thereof connected to the control of the auxiliary register 13 for reading out in parallel to the bus 11. The set terminal of the latch 73 is connected to the output of a logical AND circuit 74 having an input connected to the output of the latch 69, A Last +, an input conductor 31 for receiving Arithmetic Codes signal and an input conductor 41 for receiving Not Complement Adjust End signal. Referring to FIG. 3c, it is seen that the information in the auxiliary register 13 is read out to the bus 11 starting at the time the A Last + latch 69 comes on.

The scanning of the bus 11 at this time by the significant digit scanner 15 is under control of a logical AND circuit 75, FIG. 2a, having its output connected to the logical OR circuit 43. The logical AND circuit 75 has one input connected to the output of the latch 69, A Last +, an input conductor 41 connected to receive a Not Complement Adjust End signal, an input conductor 31 for receiving an Arithmetic Codes signal and an input conductor 42 for receiving a Not C impulse Reset signal.

The outputs of all of the stages of the significant digit scanner 15 are then looked at under control of a logical AND circuit 76 having its output connected to the input of a driver 77 having its output connected to the check readout control of the significant digit scanner 15. The logical AND circuit 76 has one input connected to the output of the significant digit scanner check latch 25 associated with the set side thereof and an input connected to receive a Program Cycle Stop signal. The Program Cycle Stop signal is developed as follows. The output associated with the set side of the latch 68, A Field End, is connected to an input of a logical AND circuit 78, also having an input for receiving a C impulse and an input connected to the output of a logical AND circuit 79. The logical AND circuit 79 has an input conductor 80 for receiving a True Add signal and an input conductor 81 for receiving an indication that the other field entered into the adder 14, the Arithmetic Field, to be combined with the information coming from the auxiliary register 13 has ended. The output of the logical AND circuit 78 is connected to the set terminal of a latch 82 designated as a "Program Cycle Last Minus" latch. The output of the latch 82 associated with the set side thereof is connected as an input to a logical AND circuit 83, also having an input conductor 37 for receiving an A impulse. The output of the logical AND circuit 83 is connected to the set side of a latch 84 termed "Program Cycle Last" latch. The output of the latch 84 associated with the set side thereof is connected as an input to a logical AND circuit 85, also having an input for receiving a C impulse. The output of the logical AND circuit 85 is connected to the input of a logical OR circuit 86. The logical OR circuit 86 also has an input connected to the output of the logical AND circuit 87. The inputs to the logical AND circuit 87 include an input for receiving a C impulse and an input connected to the output of a logical AND circuit 88 having an input conductor 89 for receiving an Arithmetic Field End signal, an input connected to the output of the latch 68 associated with the set side thereof and an input conductor 90 for receiving a Complement Add signal. The output of the logical OR circuit 86 is connected to the set side of a latch 91. This latch is termed the "Program Cycle Last +" latch. The output of the latch 91 associated with the set side thereof is connected as an input to a logical AND circuit 92, also having an input conductor 37 for receiving an A impulse. The output of the logical AND circuit 92 is connected to the set terminal of a latch 93 termed "Program Cycle Test" latch. The output of the Program Cycle Test latch 93 associated with the set side thereof is connected to an input for a logical AND circuit 94, also having an input for receiving a C impulse. The output of the logical AND circuit 94 is connected to the set terminal of a latch 95 designated "Program Cycle Stop" latch. The output of the Program Cycle Stop latch 95 associated with the set side thereof is connected to an input of a logical AND circuit 96, also having an input conductor 37 for receiving an A impulse. The output of the logical AND circuit 96 is connected to a set terminal of a latch 97 designated "Program Cycle Stop +" latch. It is thus seen that the Program Cycle Stop signal is available when the latch 95 is set.

Figure 2B:
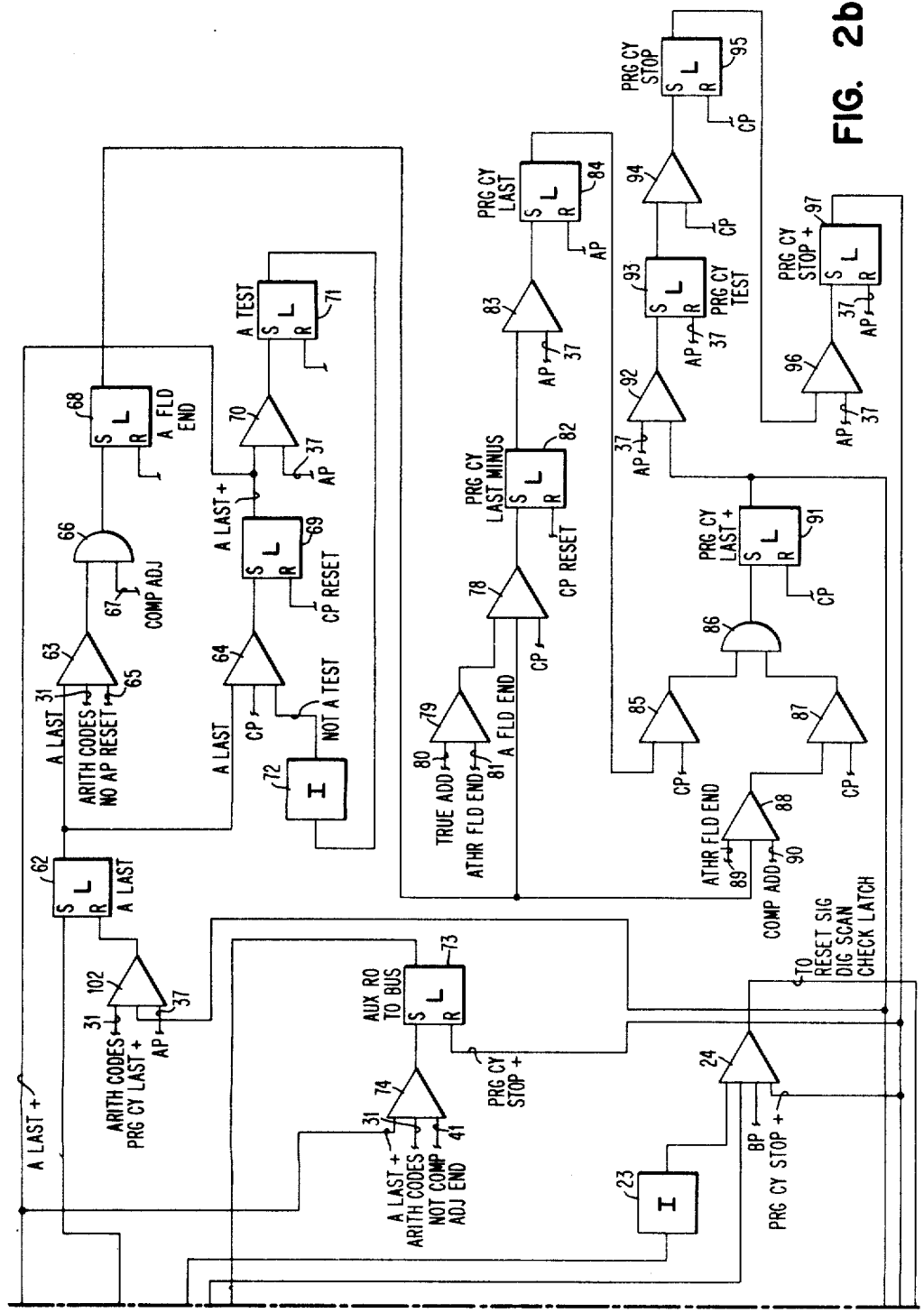

Hence, the other output windings of all stages of the significant digit scanner will be driven by the driver 77. The other output windings of the stages, which are commonly connected, are connected to the input of the inverter 23. The output of the inverter 23 is connected to an input of the logical AND circuit 24, which also has an input connected to the another output winding of the ZERO position of the significant digit scanner 15, an input connected to receive a B impulse and an input connected to the output of the Program Cycle Shop + latch 97. The output of the logical AND circuit 24, FIG. 2b, is connected to the reset terminal of the latch 25, FIG. 2a. The output of the latch 25 associated with the set side thereof is also connected to the logical AND circuit 26. The logical AND circuit 26 also has an input for receiving a C impulse and an input connected to the Program Cycle Stop + latch 97. The combination of these latter two signals, in effect, amount to the test impulse shown in FIG. 1. The output of the logical AND circuit 26 is connected to the set terminal of the error latch 27. The output of the latch 27 is connected to error controls for the data processing machine and to activate an error light, not shown.

The latch 57, for controlling the advancement of the auxiliary register 13, is reset under control of a logical AND circuit 98 having its output connected to the reset terminal of the latch 57. The inputs to the logical AND circuit 98 include an input connected to the output of the significant digit scanner check latch 25, an input conductor 37 for receiving an A impulse, and an input connected to the output of the Program Cycle Last + latch 91. The latch 53, for controlling the shifting of the shift register 16, is reset either under control of a logical AND circuit 99, or a logical AND circuit 100. The outputs of the logical AND circuits 99 and 100 are connected as inputs to a logical OR circuit 101 having its output connected to the reset terminal of a latch 53. The logical AND circuit 99 has one input connected to the output of the A Last + latch 69 and another input connected to a conductor 37 for receiving an A impulse. The logical AND circuit 100 has an input conductor 31 for receiving an Arithmetic Codes signal, an input conductor connected to the output of the Program Cycle Last + latch 91 and an input conductor 37 for receiving an A impulse. The latch 73, for controlling the readout of data from the auxiliary register 13 to the bus 11, is reset by a signal from the Program Cycle Stop + latch 97. The latch 62, which is really comparable to the latch 17 in FIG. 1., has its reset terminal connected to the output of a logical AND circuit 102. The logical AND circuit 102 has an input conductor 31 for receiving an Arithmetic Codes signal, an input conductor connected to the output of the Program Cycle Last + latch 91 and an input conductor 37 for receiving an A impulse.

From the above a very important feature of the invention becomes more apparent. This more important feature enables the detection of an error or failure of the significant digit scanner to detect the actual high order significant digit in the data transferred to the bus 11 from the accumulator 10. For instance, when the significant digit scanner 15 initially scans the bus 11, after the information has been read out to the bus 11 from the accumulator 10, it is quite possible that the core winding for the associated high order digit position or the switching apparatus associated with that core winding could fail. However, since a shift of at least one digit position always takes place for shifting the data from the auxiliary register 13 to the adder 14, then the data remaining in the register 13 also has been shifted and, after this data has transferred to the bus 11, it will be scanned by the significant digit scanner 15. During this latter scanning operation, the previously failed core winding and/or the associated switching apparatus will not be used for scanning the high order significant digit because the data has been shifted. Hence, a different core winding and associated switching apparatus will be scanning the bus 11 for the high order significant digit. By this arrangement, a valid check can be made.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing machine, data storage means having a plurality of positions for storing data in coded form, said data storage means having the facility to receive data to be stored in parallel and to enable the transfer of data therefrom in serial and parallel fashion; significant digit scanning means operably connected to scan data transferred in parallel to and from said data storage means to determine the high order significant digit thereof; and shift register means having a plurality of positions corresponding to the position of said data storage means, the positions of said shift register being connected to be set by the location of the high order significant digit in said significant digit scanner, whereby the indication of the high order significant digit is transferred from said significant digit scanner to said shift register.

2. In a data processing machine as in claim 1 wherein said shift register means comprises a single magnetic core per position shift register.

3. In a data processing machine, data storage means having a plurality of positions for storing data in coded form, said data storage means having the facility to receive data to be stored in parallel and to enable the transfer of data therefrom in serial and parallel fashion; significant digit scanning means operably connected to scan data entered in parallel into said data storage means to determine the highest significant digit thereof; shift register means having a plurality of positions corresponding to the positions of said data storage means, the positions of said shift register being connected to be set by the highest significant digit detected by said significant digit scanner to receive an indication of the highest significant digit; and detecting means connected to be activated by said shift register upon the indication of the highest significant digit being shifted from said shift register.

4. In a data processing machine according to claim 3, wherein said data storage means and said significant digit scanning means are operably connected under control of said detecting means whereby data is transferred in parallel from said data storage means and said significant digit scanning means is caused to scan the transferred data to determine any significant digit thereof upon said detecting means being activated.

5. In a data processing machine as in claim 4 further comprising checking means connected to said detecting means and to said significant digit scanning means and operably controlled by said detecting means for determining if said significant digit scanning means has detected a significant digit in the data transferred in parallel from said data storage means.

6. In a data processing machine as in claim 5 wherein said checking means generates an error signal if said significant digit scanner has detected a significant digit in the data transferred in parallel from said data storage means.

7. In a data processing machine, first data storage means having significant data stored in certain storage positions of a plurality of data storage positions, said first data storage means having the facility to permit the transfer of data from said plurality of storage positions in parallel; a bus connected to receive data transferred in parallel from said first data storage means, said bus being adapted to temporarily store data received thereby; second data storage means having a plurality of data storage positions for storing data, said second data storage means being connected to said bus to receive data to be stored in parallel and having the facility to enable the transfer of data serially and parallelly; significant digit scanning means connected to scan said bus to indicate any high order significant digit thereon, said significant digit scanning means having a plurality of stages corresponding to said positions of said second data storage means arranged in a predetermined manner and connected to said bus so that each stage is capable of indicating a high order digit position when a high order digit appears on the associated connection to the bus and another stage connected to said bus for indicating that no significant digits are on said bus, all of said stages having several separate outputs; shift register means having a plurality of stages corresponding to said positions of said second data storage means, each stage being connected to one output of a corresponding stage of said plurality of stages of said significant digit scanning means, said shift register having the facility to be shifted in synchronism with said serial transfer of data from said second data storage means whereby, when the high order significant digit is transferred from said second data storage means, an output is generated by said shift register; means connected to said second data storage means and said shift register means to shift the same serially in synchronism, and detecting means connected to said shift register means for detecting an output from said shift register means.

8. In a data processing machine as in claim 7 wherein said detecting means is connected to one output of said another stage of said significant digit scanning means to be activated by a signal appearing on said one output.

9. In a data processing machine as in claim 8 further comprising control signal generating means connected to be activated to generate a series of predetermined control signals upon said detecting means detecting an output from said shift register, said second data storage means and said significant digit scanning means being connected to receive control signals from said control signal generating means whereby data is transferred in parallel from said second data storage means to said bus and said significant digit scanning means is caused to scan said bus for any significant digits; and test means having one input commonly connected to other outputs of said plurality of stages of said significant digit scanning means and another input connected to another output of said another stage of said significant digit scanning means, said test means connected to be controlled by a signal from said control signal generating means whereby, upon receiving a signal therefrom, said test means generates an error signal if there is a signal on said one input thereto and fails to generate an error signal if there is a signal on said another input thereto.

10. In a data processing machine as in claim 9 further comprising indicating means connected to said test means for indicating that said test means has generated an error signal.

11. In a data processing machine, a data storage device having a predetermined number of denominationally ordered data storage positions, said positions thereof being connected so that data can be stored in parallel and can be shifted from position to position; a data transfer bus having the facility for temporarily storing data in denominationally ordered positions; significant digit scanning means for providing a signal indicating a high order significant digit, said significant digit scanning means having a plurality of denominationally ordered signal generating devices; means for connecting each signal generating device of said significant digit scanning means to said data transfer bus; a shift register having a number of data storage positions corresponding to the number of data storage positions of said data storage device, each position capable of being set, by a signal applied thereto; means for connecting said signal generating devices of said significant digit scanning means to corresponding positions of said shift register; a program controller; means under control of said controller for shifting said second data storage device and said shift register in synchronism; detecting means for detecting an output signal from said shift register; and means under control of said detecting means for stopping the shifting of said shift register and said second data storage device in response to an input signal from said shift register.

12. In a data processing machine as in claim 11 further including a control pulse generator conected to said detecting means and operable to generate a plurality of control signals upon said detecting means detecting an output signal from said shift register; circuit means connecting said control pulse generator to said data storage device whereby a control signal from said control pulse generator over said circuit means will cause a readout of data from said data storage device to said data transfer bus; circuit means connecting said control pulse generator to said significant digit scanning means whereby a signal from said control pulse generator to said significant digit scanning means causes the same to scan said data transfer bus for a high order significant digit; and means connected under control of said control pulse generator for checking said significant digit scanning means to determine whether or not a high order significant digit had been detected thereby after the same scanned said data transfer bus in response to a signal from said control pulse generator.

13. In a data processing machine as in claim 12 wherein one of said plurality of denominationally ordered signal generating devices of said significant digit scanning means provides a signal in the absence of a high order significant digit; an inverter having its input connected to said one signal generating device; a first logical AND circuit having one input connected to the output of said inverter and another input commonly connected to the other signal generating devices of said plurality of denominationally ordered signal generating devices of said significant digit scanning means; a control latch having its set position connected to said program controller and its reset terminal connected to the output of said logical AND circuit; a second logical AND circuit having one input connected to the output of said latch associated with the set side thereof and another input connected to the control pulse generator; and an error indicating latch having its set terminal connected to the output of said second logical AND circuit whereby if said control latch is in the set condition when a signal is transferred from said control pulse generator to said second logical AND circuit said error indicating latch is set to indicate an error.

14. In a data processing machine, a first data storage means having a predetermined number of denominationally ordered data storage positions; a data transfer bus having the facility for temporarily storing data in denominationally ordered positions; means for connecting each storage position of said first data storage means to said data transfer bus; a second data storage device having a predetermined number of denominationally ordered data storage positions, said positions thereof being connected so that data can be shifted position to position; means for connecting each storage position of said second data storage means to said data transfer bus; significant digit scanning means for providing a signal indicating a higher order significant digit, said significant digit scanning means havng a plurality of denominationally ordered signal generating devices, each being capable of detecting and indicating a high order significant digit; means for connecting each signal generating device of said significant digit scanning means to said data transfer bus; a shift register having a number of data storage positions corresponding to the number of data storage positions of said second data storage device; means for connecting said signal generating devices of said significant digit scanning means to corresponding positions of said shift register; a program controller; circuit means connecting said first data storage device under control of said program controller whereby, in response to a signal from said program controller, data is read out from said first data storage means to said data transfer bus; circuit means connecting said second data storage device under control of said program controller whereby data read out from said first data storage device to said data transfer bus is read into said second data storage device from said data transfer bus; first circuit means connecting said significant digit scanning means under control of said program controller whereby said significant digit scanning means is rendered operative for providing a signal indicating a high order significant digit of data transferred from said first data storage device to said data transfer bus; second circuit means connecting said significant digit scanning means under control of said program controller for transferring the signal indicating a high order significant digit to said shift register; means under control of said program controller for shifting said second data storage device and said shift register in synchronism; detecting means for detecting an output signal from said shift register; and means under control of said detecting means for stopping the shifting of said shift register and said second data storage device in response to an output signal from said shift register.

15. Data transfer control apparatus for controlling the transfer of variable length data words from a storage device comprising: determining means operably connected to said data storage device for determining the length of any data word entered therein; indicating means operably connected to said determining means for providing an indication of the extremities of said any data word as determined by said determining means, said indicating means having the facility for storing said indications; and means connected to said indicating means for progressively changing the location of said indications within said indicating means as said any data word is progressively transferred from said data storage device so as to progressively modify said indications in direct relationship to the progressive modification of the length of said any data word as the same is progressively transferred from said data storage device.

16. Data transfer control apparatus as in claim 15 wherein said determining means determines the length of said any data word by detecting the high order significant digit thereof.

17. Data transfer control apparatus as in claim 15 wherein said indicating means has a final position for storing said indications and further comprising detecting means connected to said final position so as to be rendered operable when said indications are transferred from said final position.

18. Data transfer control apparatus as in claim 15 further comprising control impulse generating means connected to said detecting means and to said determining means so as to be rendered operable by said detecting means and, upon being rendered operable, thereby cause said determining means to determine the length of any remaining data word in said data storage device; and means operably connected to said determining means for generating a signal if there is a remaining word in said data storage device.

References Cited in the file of this patent
UNITED STATES PATENTS

| | | |
|---|---|---|
| 2,916,210 | Selmer | Dec. 8, 1959 |
| 2,951,233 | Tanco et al. | Aug. 30, 1960 |

UNITED STATES PATENT OFFICE
CERTIFICATE OF CORRECTION

Patent No. 3,160,857                          December 8, 1964

Donald I. Frush

It is hereby certified that error appears in the above numbered patent requiring correction and that the said Letters Patent should read as corrected below.

Column 12, line 71, for "input" read -- output --.

Signed and sealed this 29th day of June 1965.

(SEAL)
Attest:

ERNEST W. SWIDER                            EDWARD J. BRENNER
Attesting Officer                                 Commissioner of Patents